(12) United States Patent
Barzelay et al.

(10) Patent No.: US 11,262,906 B2
(45) Date of Patent: Mar. 1, 2022

(54) IN-PLACE SCROLLING FOR A USER INTERFACE

(71) Applicant: Amazon Technologies, Inc., Seattle, WA (US)

(72) Inventors: Zohar Barzelay, Potsdam (DE); Bojan Pepik, Berlin (DE)

(73) Assignee: Amazon Technologies, Inc., Seattle, WA (US)

(*) Notice: Subject to any disclaimer, the term of this patent is extended or adjusted under 35 U.S.C. 154(b) by 93 days.

(21) Appl. No.: 16/539,277

(22) Filed: Aug. 13, 2019

(65) Prior Publication Data

US 2021/0048931 A1 Feb. 18, 2021

(51) Int. Cl.
| | | |
|---|---|---|
| *G06F 3/0485* | (2013.01) | |
| *G06F 16/538* | (2019.01) | |
| *G06N 20/00* | (2019.01) | |
| *G06F 3/0482* | (2013.01) | |
| *G06F 3/0484* | (2013.01) | |
| *G06F 3/04847* | (2022.01) | |
| *G06Q 30/06* | (2012.01) | |

(52) U.S. Cl.
CPC .......... *G06F 3/0485* (2013.01); *G06F 3/0482* (2013.01); *G06F 3/04847* (2013.01); *G06F 16/538* (2019.01); *G06N 20/00* (2019.01); *G06F 2203/04806* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 10,109,051 B1* | 10/2018 | Natesh | ................ | G06K 9/4652 |
| 10,691,740 B1* | 6/2020 | Anorga | ................... | G06F 16/54 |
| 2009/0184865 A1* | 7/2009 | Vaio | .................. | G06K 9/00208 |
| | | | | 342/25 F |

(Continued)

OTHER PUBLICATIONS

Wei Zhang, E. Antunez, S. Gokturk and B. Sumengen, "Apparel silhouette attributes recognition," 2012 IEEE Workshop on the Applications of Computer Vision (WACV), Breckenridge, CO, USA, 2012, pp. 489-496, doi: 10.1109/WACV.2012.6162993. (Year: 2012).*

(Continued)

*Primary Examiner* — Henry Orr
(74) *Attorney, Agent, or Firm* — Kilpatrick Townsend & Stockton LLP

(57) ABSTRACT

Techniques for providing an in-place scrolling feature are described herein. Input via a user interface may be received to update first images of first items to second images of second items where the first images are presented in a focus location of the user interface. Feature vectors may be calculated for each image associated with the first items and the second items using a neural network algorithm. The feature vectors may include a plurality of values that represent each image of the first items and the second items. Candidate images may be determined from the second images based on a distance in a feature vector space between the feature vectors of the candidate images and the feature vectors of the second images. The user interface may be updated to transition from presenting the first images to a portion of the candidate images in the focus location of the user interface.

7 Claims, 13 Drawing Sheets

(56) References Cited

U.S. PATENT DOCUMENTS

| | | | | |
|---|---|---|---|---|
| 2012/0054060 A1* | 3/2012 | Kundu | ............... | G06Q 30/0643 |
| | | | | 705/26.5 |
| 2017/0061528 A1* | 3/2017 | Arora | .................... | G06F 16/958 |
| 2019/0130285 A1* | 5/2019 | Snyder | ................... | G06N 5/022 |
| 2020/0410553 A1* | 12/2020 | Watson | .............. | G06Q 30/0277 |

OTHER PUBLICATIONS

Application No. PCT/US2020/041137, International Search Report and Written Opinion, dated Sep. 9, 2020, 13 pages.

* cited by examiner

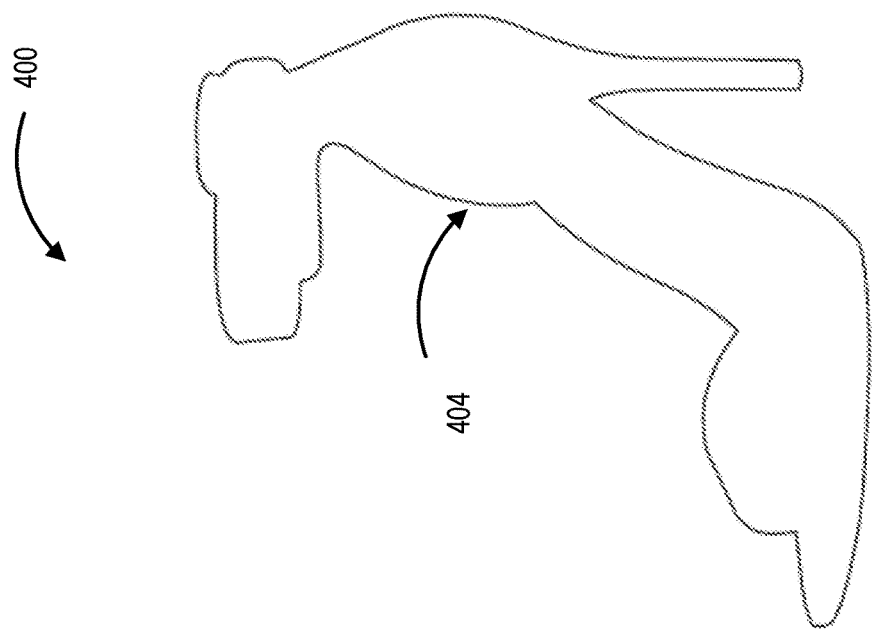
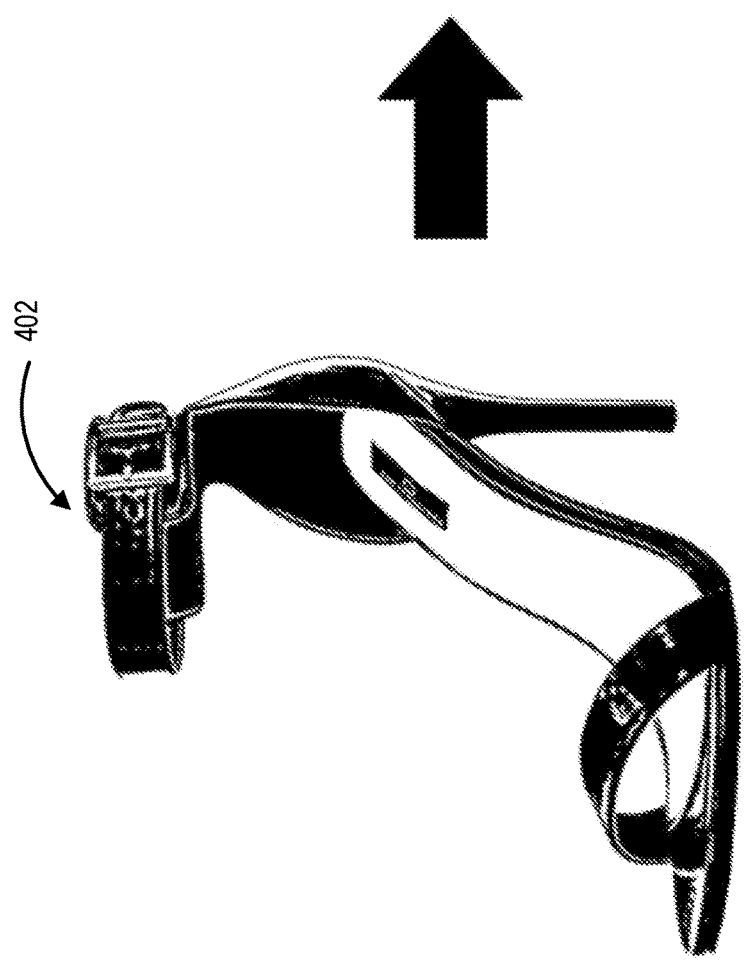
FIG. 4

```
                                                        ← 1100

┌─────────────────────────────────────────────┐
    │  OBTAIN FIRST INPUT VIA A PRESENTED USER    │
    │  INTERFACE TO UPDATE ONE OR MORE FIRST      │
    │  IMAGES OF FIRST ITEMS TO SECOND IMAGES     │─ 1102
    │  OF SECOND ITEMS AT A FOCUS LOCATION OF     │
    │  THE USER INTERFACE                         │
    └─────────────────────────────────────────────┘
                           │
                           ▼
    ┌─────────────────────────────────────────────┐
    │  IN RESPONSE TO OBTAINING THE FIRST INPUT:  │
    │  UPDATE THE USER INTERFACE TO TRANSITION    │
    │  FROM PRESENTING THE FIRST IMAGES OF THE    │
    │  FIRST ITEMS TO A PORTION OF THE SECOND     │─ 1104
    │  IMAGES IN THE FOCUS LOCATION WHILE         │
    │  MAINTAINING THE FOCUS LOCATION AT A SAME   │
    │  PART OF THE USER INTERFACE                 │
    └─────────────────────────────────────────────┘
```

FIG. 11

IN-PLACE SCROLLING FOR A USER IN INTERFACE

BACKGROUND

Users of online marketplaces can currently browse, purchase, rent, or utilize a variety of items and services offered by multiple sellers (which may be other users), manufacturers, or providers associated with the online marketplaces. Users may wish to browse or view multiple items in a user interface for comparison purposes. Conventional user interfaces may limit a user to only viewing one item at a time with other items being just out of vision, partially displayed, or otherwise not easily browsed or viewed. This presentation and use of space in the user interface may cause users to have to provide input which corresponds to a scroll action and move the user interface to view the partially displayed items or images of the item. Further, conventional user interfaces may organize items presented via a user interface in such a manner that the user must scroll through or provide input to browse through multiple items before finding items they are interested in or that are similar to a currently viewed item.

BRIEF DESCRIPTION OF THE DRAWINGS

Various embodiments in accordance with the present disclosure will be described with reference to the drawings, in which:

FIG. 4 illustrates an example image silhouette extraction from an image of an item by a computer system implementing the in-place scrolling feature, in accordance with embodiments;

FIG. 11 illustrates an example flow diagram for an in-place scrolling feature, in accordance with embodiments;

DETAILED DESCRIPTION

Figure 1:
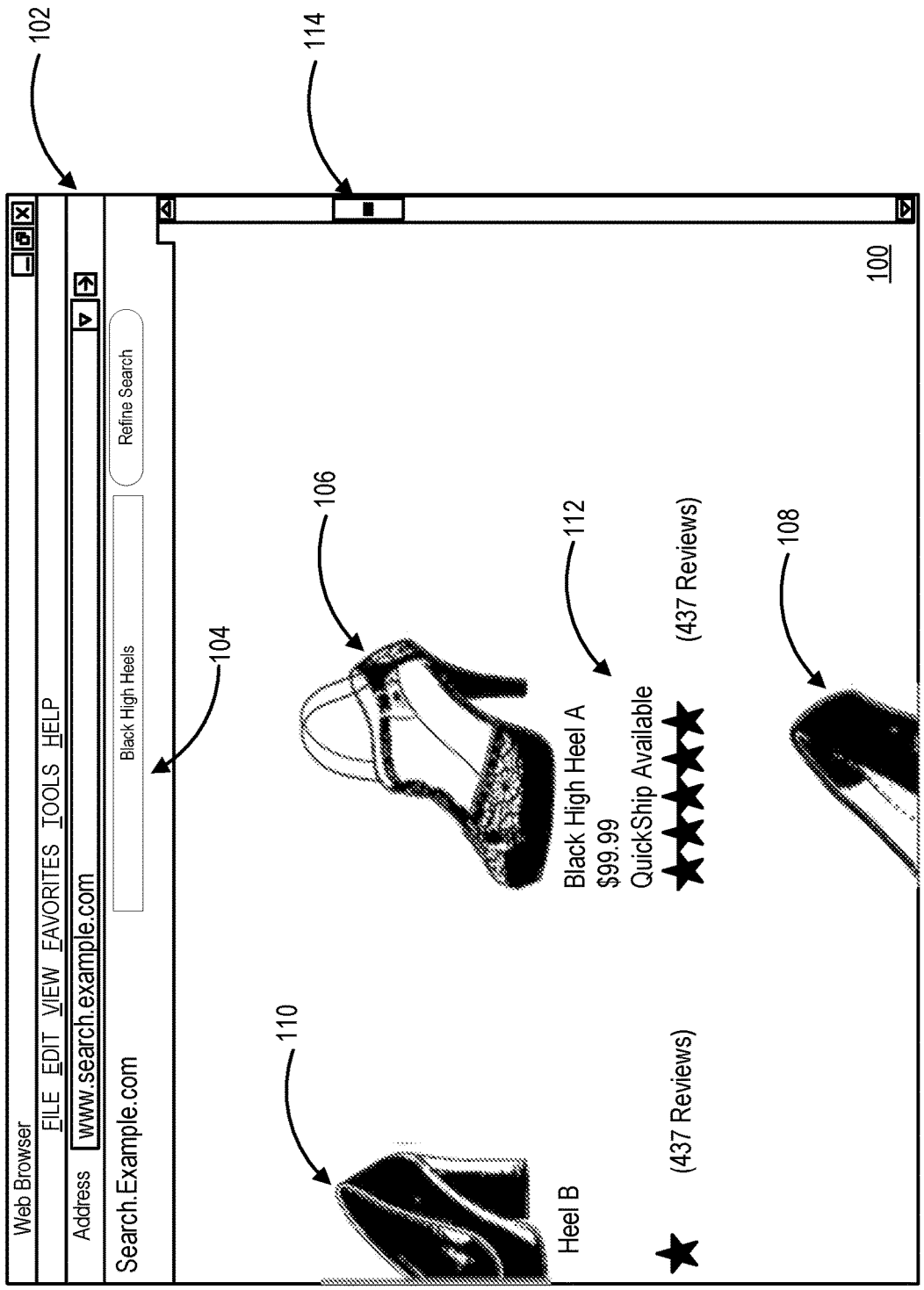
FIG. 1 illustrates an example conventional user interface that does not include an in-place scrolling feature.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide an in-place scrolling feature to update a user interface to present images of similar products to a currently viewed product in response to a gesture provided by a user interacting with the user interface. Conventionally, a user may provide a scrolling gesture such as using a middle mouse button of a mouse or a finger swipe etc., to scroll through a user interface in order to view different images of items in a user interface. For example, a typical user interface may only present an image of one item centered in a user interface while presenting partial images or other indicators of other images in the periphery of the user interface or in a non-central location of the user interface. This presentation of images or information is conventionally utilized to inform the user that by providing input, such as a scrolling gesture, they may update the user interface to move to a different location in an application or web page presented in the user interface to view the partial or periphery images in the central location.

However, as a user scrolls through the web page or application presented via the user interface by providing input the images on the screen are moving making it difficult for the user to properly view or comprehend the images until they stop providing the input. This motion may be described as a scroll-stop motion or gesture that a user may utilize to stop moving the user interface and view and image. The in-place scrolling feature described herein updates the images of items presented to a user in response to input (e.g., a scrolling gesture) in the same location of the user interface as the currently viewed images such that the user does not lose time or focus when browsing images such as images of items. Put another way, the user input or gesture remains the same but the images presented change in-place or in the same place of the user interface instead of the user having to scroll to different portions of a user interface to properly view other images.

In some of the disclosed embodiments, an image presented via a user interface at a location that occupies the most screen real estate space, is centrally located, or is otherwise denoted as the image of interest may be referred to as a focus location for the user interface. As described above, the focus location of conventional user interfaces is manipulated by a user providing input, such as a scrolling gesture, to move the user interface to focus on other portions of a web page or application such as when they wish to focus on other images of items presented via an electronic marketplace. In some embodiments, the in-place scrolling feature described herein provides the ability to update the images presented to the user in the focus location without moving the focus location of the user interface. Instead, the images are transitioned to new images in-place while maintaining the focus location of the user interface.

In embodiments, the in-place scrolling feature described herein also provides a pleasing transition between similar images as switching between different looking images might be visually confusing to a user. In accordance with at least one embodiment, the in-place scrolling feature determines the images to present in-place by training a deep neural network or using a trained deep neural network to extract feature vectors for each possible or candidate image including a currently viewed image. In embodiments, the feature vectors for an image may include numbers of values that represent the image. Although the term "deep neural network" is used through this description for clarity, any suitable reinforcement-based machine learning model may be utilized including supervised and unsupervised machine learning. In embodiments, any number of methods may be used to extract features which provide a representation of an image be it a feature vector or a set of attributes that result in identifying similar images, whether they be visually similar or conceptually similar (having similar attributes), by comparing the feature vectors or set of attributes in a space such as a feature vector space.

The deep neural network may represent images as a vector of continuous valued numbers that are associated with an image's shape, color, text, etc. However, the shape, color, silhouette, and texture of an image are not necessarily explicitly represented by the feature vectors. In embodiments, an images shape, color, text, etc., could be represented by the continuous valued numbers such as by concatenating the values to a feature-vector (an extra descriptor) or a filter might be utilized which filters which images are considered for comparison. In some embodiments, the service provider computer may be configured to obtain a derivative of an image surface and concatenate the derivatives together using a histogram of gradients. In embodiments, the service provider computer implementing the in-place feature utilizes a Euclidean distance between feature vectors of images to determine if they are similar images (e.g., two similar images will have respective feature vectors with a Euclidean distance in the feature vector space). In embodiments, the service provider computer implementing the in-place feature may utilize any distance between feature vectors to determine whether they are similar images such as a cosine-distance (dot product) in a vector space. In accordance with at least one embodiment, a service provider computer implementing the in-place scrolling feature may select the images to present in-place at a focus location based on a Euclidean distance between the feature vectors of any two given images. A number of candidate images may be selected by the service provider computer to include in a transition of images at a focus location as the user provides input by selecting the images that have the smallest Euclidean distance or based on a comparison of the Euclidean distance of two given images and a threshold. Determining the specific images to include in a transition from one image to another, given a source image (e.g., the image that a user has focused on or is in a focus location of a user interface) by comparing the Euclidean distance between feature vectors of the source image and the specific images may be referred to as finding the nearest neighbor image in a feature vector space. In embodiments, the distance between feature vectors of images in a vector space may only be one factor or attribute utilized by the service provider computer when determining which specific images to transition to in response to receiving input that updates a user interface. For example, the distance between feature vectors of images in a vector space may be associated with a certain weight and the service provider computer may make a weighted decision using other factors or attributes such as a relevance of a specific image to a user (based on the user's browsing history), review ratings for an item included in an image, price, etc. Each factor or attribute may be associated with a given weight that the service provider computer may utilize when determining candidate images or images to include when updating images in a user interface in-place or while maintaining the focus location of the user interface. It should be understood that feature vectors for images may be determined by the service provider computer implementing the in-place scrolling feature prior to receiving any input to update images presented via a user interface.

In embodiments, by transitioning from a source image to one of the images that has a small Euclidean distance from the source image when comparing feature vectors of the images can result in a smooth and pleasing transition as images included in the transition may have similar features, colors, shape, size, etc. By using many (e.g., 10, 20, 50 or more) such transitions between points in the feature vector space beginning at a source image and ending at a destination image, a visually pleasing "morphing" animation may be generated in real-time or near real-time. In accordance with at least one embodiment, the service provider computers may generate the feature vectors for each image of an electronic marketplace or other entity at a predetermined time or it may generate the feature vectors for images included in a result set of images in response to a query in real-time or near real-time. A comparison of feature vectors for an image and selection of candidate images to include in a transition of the in-place scrolling feature described herein may be performed dynamically as a user provides input by interacting with a user interface. In accordance with at least one embodiment, the service provider computer implementing the in-place scrolling feature may be configured to use one or more computer vision techniques to extract silhouettes of items included in an image. In embodiments, the service provider computer may utilize the Euclidean distance between the feature vectors of images as well as a comparison of extracted silhouettes to determine the candidate images that should be utilized in the transitioning of images in-place at a focus location of a user interface. The service provider computer may calculate differences between silhouettes of images or items in an image by using computer vision techniques which compare pixel distances or differences between the silhouettes or compare curves, peaks, and valleys of the silhouettes to determine differences and similarities.

In a non-limiting example, the service provider computer implementing the in-place scrolling feature may transmit information or data to a user device presenting a user interface which updates the user interface to present images of items and information about the items in response to a query. For example, a user may interact with a user device and associated user interface to search for, or query about, black high heel shoes. In response, the user interface may be updated to present a plurality of images of black high heels and information about the black high heels such as a text description, a review of the item, and a price of the item. A user may utilize a mouse of the user device or a touch-screen of the user device to interact with the user interface and select an image of an item for further browsing or inspection. The user may wish to view or browse other similar items or images as the currently viewed image and as such provides input, via the user device, that corresponds to a vertical scroll of the user interface. In response to receiving the vertical scroll input, the service provider computer may generate the feature vectors for the image of the item as well as feature vectors for other images of related items (items in the same item category) and determine one or more candidate images to transition to in the user interface based on a Euclidean distance between the feature vectors of the images. The service provider computer may provide information which causes the user interface to update and transition from the currently viewed image to a portion of the one or more candidate images in-place or at a focus location of the user interface such that the user interface does not scroll but instead the images are updated and presented in-place at the user interface. The user can continue to browse other images of black high heels by continuing to provide input via the user device or select a particular image of an item to view detailed information about the item and order the item.

The processes and systems described herein may be an improvement on conventional user interface and transitions between images presented via the user interface. For example, conventional user interfaces that present images in a configuration that forces a user to scroll or provide input/gestures to move the focus of the user interface to a different portion of a presented web page or application in order to view other images. However, during this scrolling input or gesture it is more difficult for the user to view or process the images as the user interface is updated. Instead, the user must stop providing input (scrolling) to view the images as the user interface updates and moves the focus location to another portion or location of the web page or application. Conventional user interface interactions can lead to inefficient use of time as a user browses images or images of items. In addition, the images that the user scrolls to in the user interface may not be of interest or are not similar to the image they were previously viewing or focused on prior to providing the input. This can result in even more inefficiencies as a user is forced to scroll to different portions of a web page or application to browse similar images or attempt to compare images or items included in images. The in-place scrolling feature implemented by the systems described herein results in more efficient browsing of a user interface presenting a web page or application as the images are updated in-place such that a transition of images can be better viewed and comprehended by the user without time spent scrolling and stopping as in conventional user interfaces. The in-place scrolling feature also provides more efficient presentation of the images in a user interface as the images transitioned to in response to a gesture or input provided by a user include images that are similar according to their extracted or determined feature vectors. As such, users can browse through images and images of items more efficiently and be presented with a smooth transition that can provide additional features such as easier comparison of images or items in images. In use cases where a user is utilizing a computer device with limited screen real estate, such as a mobile phone, the use of the in-place scrolling feature can provide smooth transitions which increase the efficiency of the user browsing through images or images of items as typically these user interfaces are limited to fewer images than larger computer devices.

FIG. 1 illustrates an example conventional user interface that does not include an in-place scrolling feature. FIG. 1 includes user interface 100 presented via web browser 102 of an example electronic marketplace. The user interface 100 may include a query field 104 that can used to receive queries regarding items offered by an electronic marketplace. For example, FIG. 1 illustrates an entry of a query for "Black High Heels" at 104. In response to the query, the user interface 100 may be updated to present one or more images 106, 108, and 110 as well as information 112 about the items included in the images 106, 108, and 110. As illustrated in FIG. 1, the image 106 is presented in a focus location of the user interface 100 while other images 108 and 110 of items pertaining to the query provided in the query field 104 are presented in a periphery or non-central location. In conventional user interfaces, this presentation of images 106, 108, and 110 may be utilized to present an image for comprehension by a user browsing the user interface 100 while denoting that images 108 and 110 can be viewed in more detail or fully upon scrolling the user interface 100 to a different location of the web browser 102.

For example, a user may provide input, via a computer mouse, that corresponds to a vertical scroll to shift the user interface 100 to place the image 108 in the center location of the user interface 100 or the focus location of the user interface 100. A user may also utilize a computer mouse or other input/output device to interact with scroll bar 114 to provide a vertical scroll input to update the user interface 100 and present other images such as image 108. As is further illustrated by FIG. 1, the images 108 and 110 are only partially or peripherally visible to the user who is viewing image 106. As such, a user is not able to easily compare the images 106, 108, and 110 nor fully comprehend or view the images 108 and 110 in their entirety. Instead, the user is forced to provide input to update the user interface 100 to transition to a different part of the user interface 100 via the web browser 102. The images 108 and 110 as presented may also not be similar items to the item displayed via image 106 which may result in a user taking more time to scroll or provide input to the user interface 100 to find similar images comparable to the image 106. The above disadvantages may be addressed by the in-place scrolling features described herein.

Figure 2:
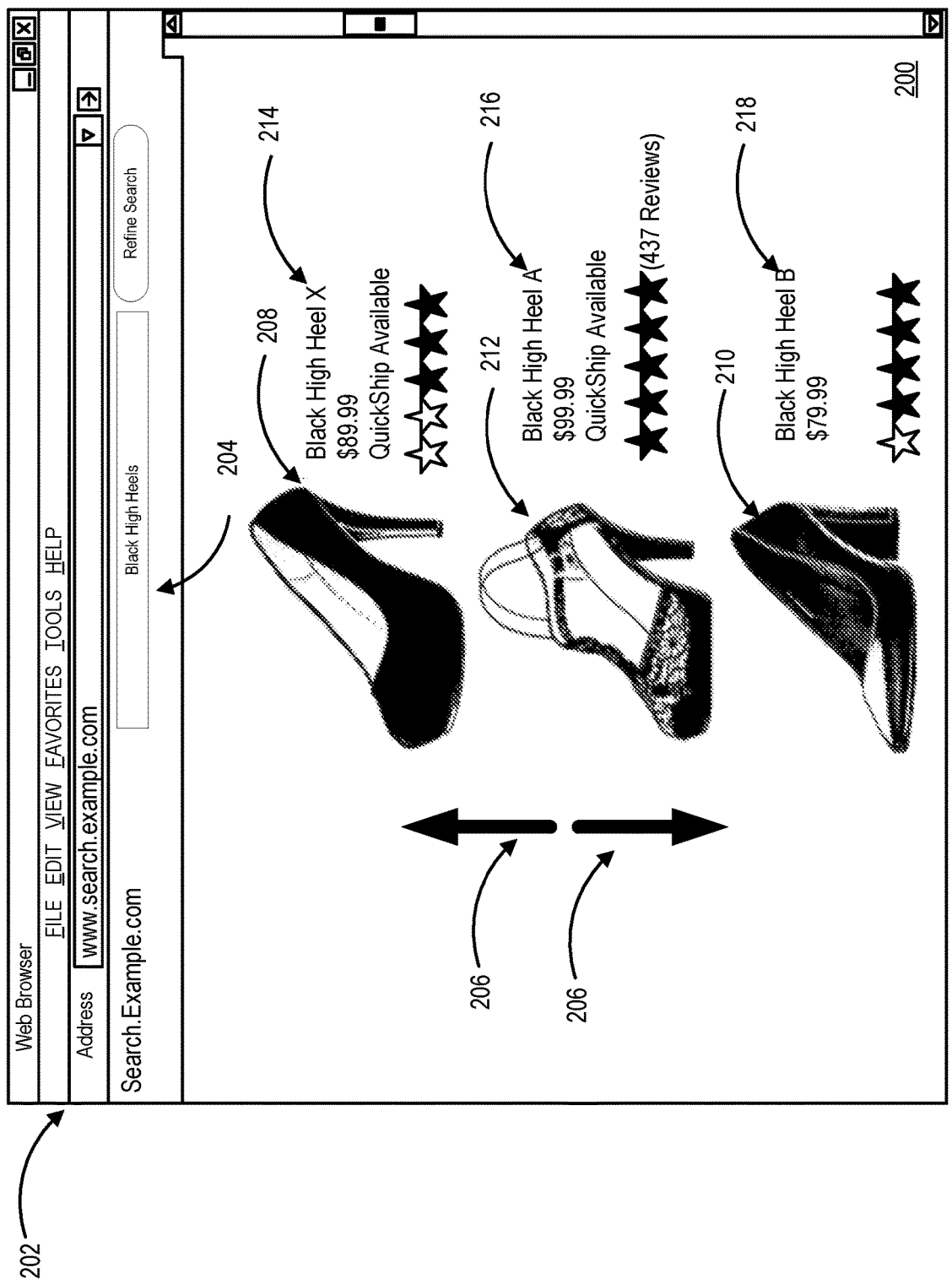
FIG. 2 illustrates an example user interface that implements the in-place scrolling feature, in accordance with embodiments.

FIG. 2 illustrates an example user interface that implements the in-place scrolling feature, in accordance with embodiments. FIG. 2 includes a user interface 200 presented via web browser 202 that implements or utilizes an in-place scrolling features in accordance with a described embodiment. The user interface 200 and web browser 202 may be configured to present images of items offered by an electronic marketplace similar to the user interface 100 and web browser 102 of FIG. 1. The web browser 202 of FIG. 2 may also include a search query field 204. As illustrated in FIG. 2 a user may provide a query for "Black High Heels" in the search query field 204. As discussed above in FIG. 1, conventional user interfaces may update a user interface to present images and information about items related to a search query with some of the images and information being in a periphery or non-central location that is less able to be fully comprehended or viewed by a user. In accordance with at least one embodiment, the service provider computer implementing the user interface 200 may be configured to receive or obtain input that corresponds to a vertical scroll 206. The user interface 200 that utilizes the in-place scrolling feature described herein prohibits movement or updating of the user interface 200 to move the focus location of the user interface 200 in response to the vertical scroll 206 input.

As illustrated, the user interface 200 presents similar images 208 and 210 to an image that was a source image 212 or image of interest. For example, given the presentation of the user interface 100 of FIG. 1, a user may have focused on or otherwise interacted with image 106 which may have served as the source image 212 of FIG. 2. In response to receiving or otherwise obtaining the vertical scroll 206 input, the user interface may be updated to transition to similar images 208 and 210 without moving the user interface 200 to a different location or without changing the focus location. As such, a user can continue to provide the vertical scroll 206 input and be presented with updated images in-place at the user interface 200 that are similar to the image 212. As depicted in FIG. 2, each image 208, 210, and 212 may also be accompanied by corresponding text such as details or information 214, 216, and 218 about the items included in images 208, 210, and 212.

As described herein, the images 208 and 210 may be selected from a plurality of images based on a measure of how "similar" the images are to each other. In some embodiments, the similarity of the images is determined or extracted as feature vectors associated with the images 208, 210, and 212 and the Euclidean distance between the feature vectors of images 208, 210, and 212. In embodiments, the images with the optimal (e.g., the smallest) Euclidean distance in the feature vector space may be selected as candidate images to update the user interface 200 by transitioning from a source image, such as image 212, in a smooth and pleasing manner. By utilizing the feature vectors of the images 208, 210, and 212, the images presented via the transition in response to the vertical scroll 206 input will be similar images and if the images include images of items they will be similar looking items. In embodiments, as the user interface 200 updates to transition from the image 212 to either images 208 or 210, the transition may be completed by slowly fading out the image 212 and corresponding information 216 and slowly fading in an image, such as image 210 and corresponding information 218 in the same place or in-place (at a focus location) of the user interface 200. This process may be referred to as a fade in and fade out process.

Figure 3:
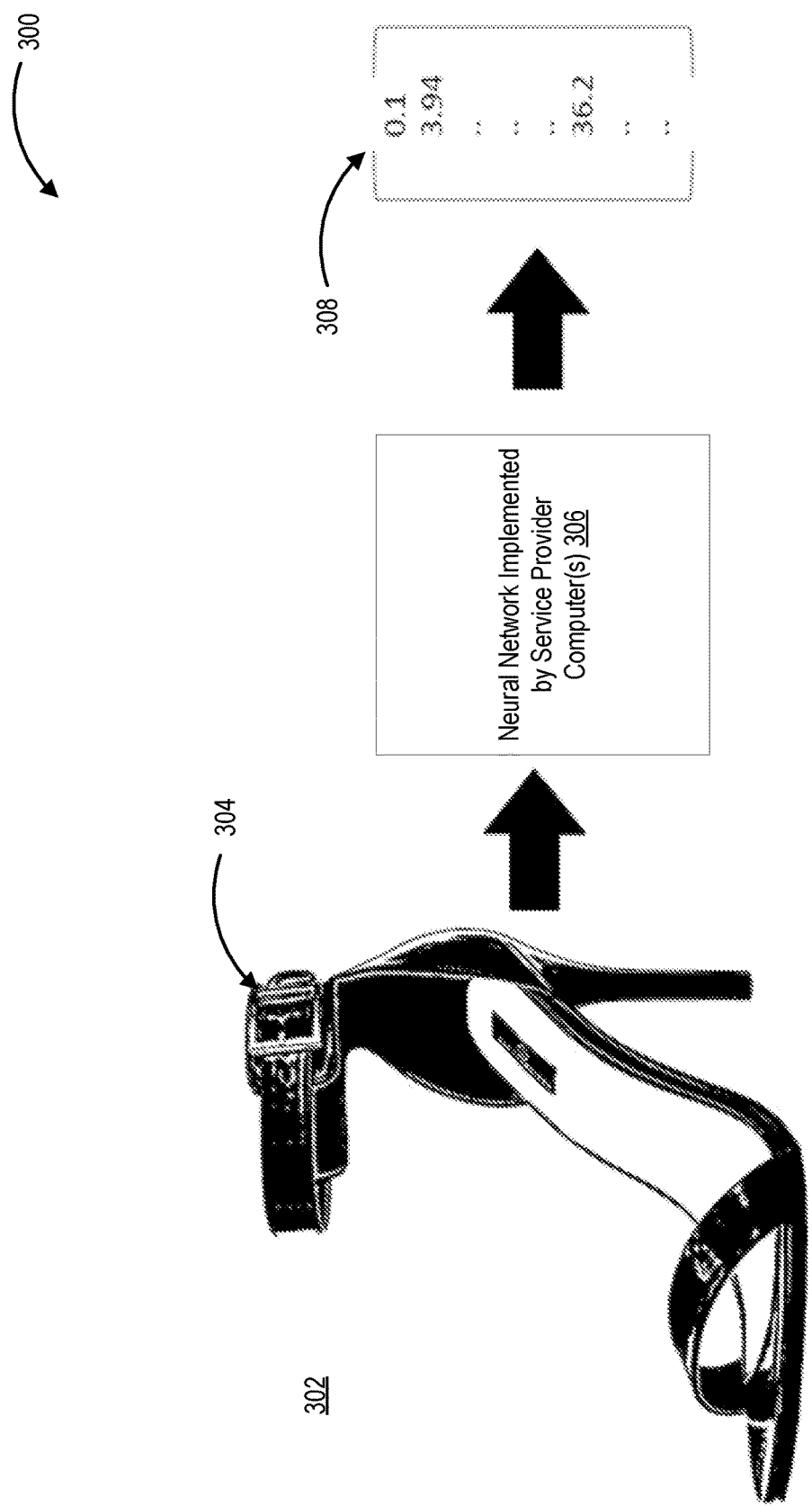
FIG. 3 illustrates an example image and corresponding feature vectors generated by a computer system implementing the in-place scrolling feature, in accordance with embodiments.

FIG. 3 illustrates an example image and corresponding feature vectors generated by a computer system implementing an in-place scrolling feature, in accordance with embodiments. The workflow 300 of FIG. 3 includes an image 302 of an item 304 such as a high heel shoe. In accordance with at least one embodiment, a service provider computer implementing the in-place scrolling features described herein may utilize a catalog of images to train a deep neural network (algorithm) to generate feature vectors that represent the images. In embodiments, the service provider computer may utilize a pre-trained deep neural network to generate feature vectors for an image. As illustrated in FIG. 3, the workflow 300 includes utilizing a neural network implemented by a service provider computer 306 to generate or extract feature vectors 308 for the image 302. In embodiments, the neural network may classify a set of images as according to their shape, color, and texture, as a vector of continuous valued numbers (feature vectors). However, the shape, color, and texture of the image are not explicitly represented by the vector of continuous valued numbers. Instead, the feature vectors are used to identify similar images based on their respective vectors or values having a small Euclidean distance from the source image. In accordance with at least one embodiment, the service provider computer implementing the neural network 306 may utilize a threshold with which to compare Euclidean distances of feature vectors for analyzed images to select one or more candidate images to transition to upon receiving input indicating a scroll gesture such as a vertical scroll gesture. The service provider computer may only utilize a set number of images that have the smallest Euclidean distances to transition to from a source image such as the five nearest neighbors or five most similar images to the source image based on the Euclidean distances of the feature vectors. The set number of images to utilize in a transition may be specified by an administrator of the service provider computer or by a user viewing images of a user interface utilizing the in-place scrolling features described herein.

FIG. 4 illustrates an example image silhouette extraction from an image of an item by a computer system implementing an in-place scrolling feature, in accordance with embodiments. FIG. 4 includes a workflow 400 depicting the extraction of an image silhouette according to embodiments of the in-place scrolling feature described herein. In embodiments, the service provider computer implementing the in-place scrolling feature described herein may utilize an image, such as image 402, to extract a silhouette 404 of the image 402 or of an item included in the image 402. For example, FIG. 4 illustrates an example image 402 of a high heel shoe and an extracted silhouette 404 of the high heel shoe of image 402. In accordance with at least one embodiment, the service provider computer implementing the in-place scrolling feature may utilize one or more computer vision algorithms or techniques to extract the silhouette of an image or an item included in an image.

As described in more detail below with reference to FIG. 5, the service provider computer may utilize computer vision techniques or algorithms to compare the extracted silhouettes from images when determining whether images are similar to each other and thus good candidates for including in a transition from a source image in response to receiving a scrolling input or gesture. For example, the service provider computer may utilize the Euclidean distance of feature vectors for two images and compare the extracted silhouettes of the images when determining the nearest neighbor or similar image to a source image. In accordance with at least one embodiment, the service provider computer may calculate differences between silhouettes of images or items in an image by using computer vision techniques which compare pixel distances or differences between the silhouettes or compare curves, peaks, and valleys of the silhouettes to determine differences and similarities. The computer vision techniques or algorithms may maintain one or more thresholds or values which indicate a difference when certain pixel distance values indicate a different shape or silhouette or differences in curves, peaks, and valleys of silhouettes indicate different shapes or silhouettes of shapes included in images that are being compared.

Figure 5:
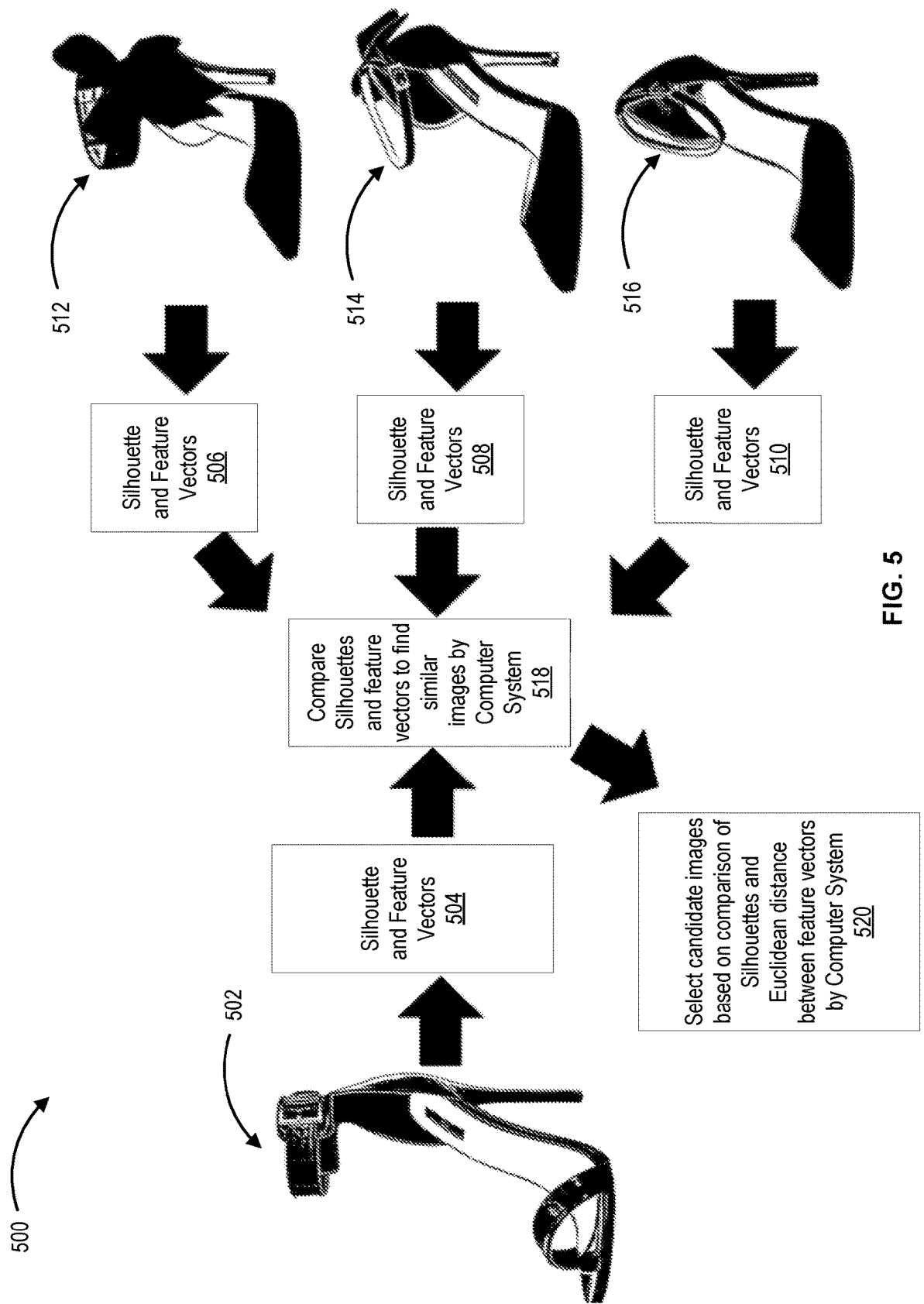
FIG. 5 illustrates an example workflow for identifying candidate images for a transition by the in-place scrolling feature, in accordance with embodiments.

FIG. 5 illustrates an example workflow for identifying candidate images for a transition by the in-place scrolling feature, in accordance with embodiments. FIG. 5 illustrates workflow 500 for determining one or more candidate images to select for transitioning from a source image to a candidate image in response to receiving input corresponding to a scroll or vertical scroll in accordance with embodiments. In workflow 500, a source image such as image 502, may be analyzed by a service provider computer implementing the in-place scrolling feature using a deep neural network and one or more computer vision techniques to extract a silhouette for and determine feature vectors 504 for image 502. The extraction of a silhouette of an image and the determination of feature vectors for an image are described herein with reference to FIGS. 2-4. In workflow 500, the service provider computer may extract silhouettes and determine feature vectors 506, 508, and 510 for potential candidate images 512, 514, and 516, respectively. In embodiments, the potential images 512, 514, and 516 may be images of items that are similar to an item of image 502.

Similar items may be determined by the service provider computer utilizing a similar or same item category associated with each item in images 502, 512, 514, and 516. In embodiments, the images 512, 514, and 516 may be selected based on an initial input for such as a search query that results in a result set that includes images 502, 512, 514, and 516. The images 512, 514, and 516 may be transitioned to in-place as described herein without identifying a similarity between the images 502, 512, 514, and 516 to provide more efficient viewing of a result set of images. In some embodiments, the images selected for extraction of silhouettes and determination of feature vectors may be based at least in part on an item categorization associated with the items included in images or predefined relationships between the items such as a browse tree navigation of an electronic marketplace or an item category relationship data object of an electronic marketplace. The workflow 500 illustrates a computer system (service provider computer) comparing silhouettes and feature vectors (Euclidean distances between the feature vectors) for images 502, 512, 514, and 516 at 518. In embodiments, the service provider computer may select candidate images 520 based on the comparison of silhouettes of images 502, 512, 514, and 516 as well as Euclidean distances between the feature vectors for 502, 512, 514, and 516. As described herein, the service provider computer may select images whose Euclidean distances of feature vectors is smallest or below a certain threshold. Computer vision techniques may be utilized by the service provider computer to compare shapes of potential candidate images to ensure similarity or, in some embodiments, to confirm the feature vector comparison and resulting Euclidean distance determination is accurate. It should be noted that although the workflow 500 of FIG. 5 includes utilizing both the silhouette comparison and feature vector comparison to select candidate images to include in a transition, embodiments disclosed herein can utilize one, both, or either combination of silhouette comparison and feature extraction to identify candidate images.

Figure 6:
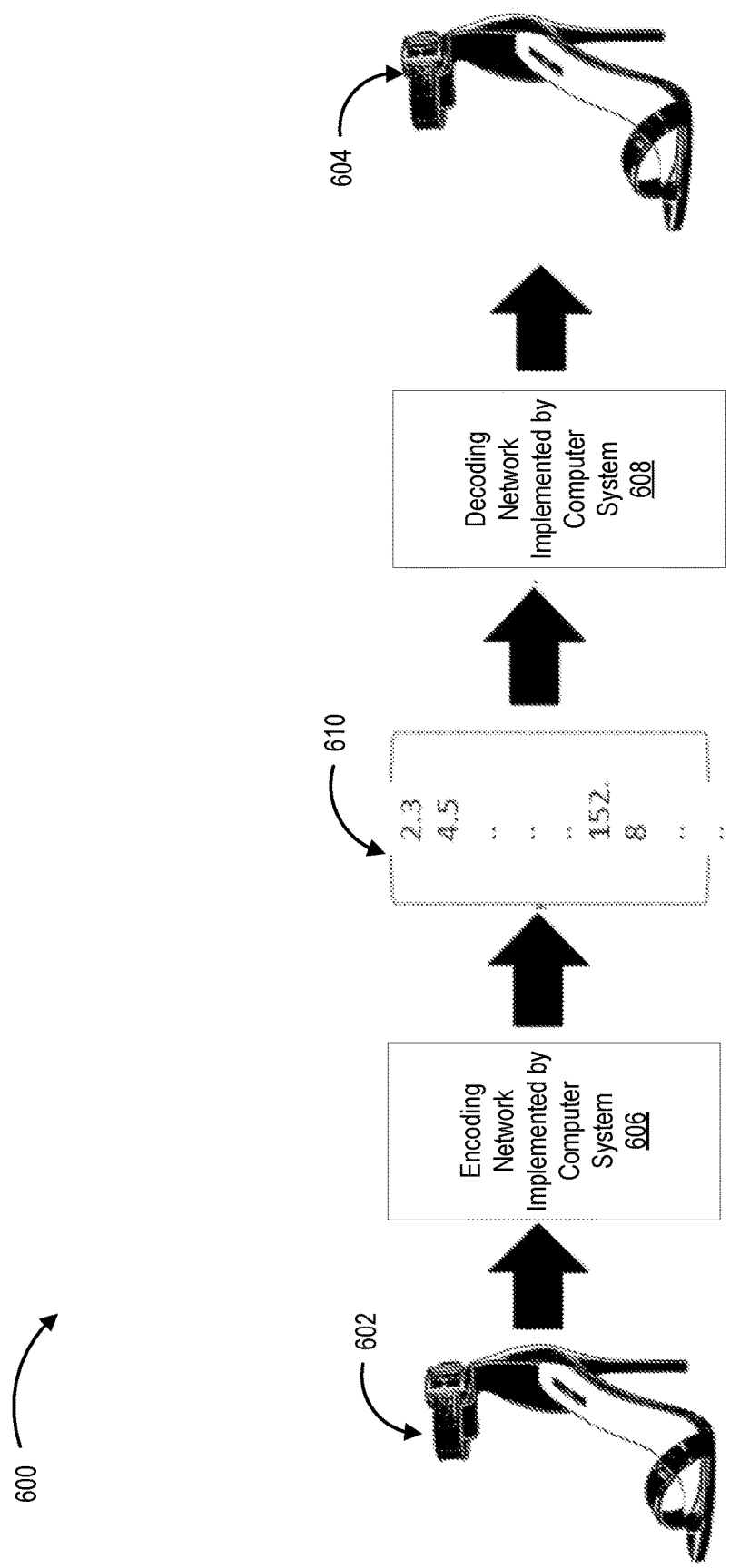
FIG. 6 illustrates an example workflow for reconstructing an image of an item by a computer system implementing the in-place scrolling feature using an encoding and decoding network, in accordance with embodiments.

FIG. 6 illustrates an example workflow for reconstructing an image of an item by a computer system implementing the in-place scrolling feature using an encoding and decoding network, in accordance with embodiments. In embodiments, the service provider computer implementing the in-place scrolling feature may utilize a number of transitions to transition from one image to another in-place or while maintaining the focus location of the user interface. For example, the transition may be similar to a fade-in/fade-out transition where a sequence of images is generated by slowly decreasing the weight of a first image and increasing the weight of a second image. For example, in the following formula where I1=image 1, I2=image 2, b is a coefficient that travels between 1 and 0, I=b*I1+(1−b)I2 and we change b between 1 and 0 (b=1.0, 0.9, 0.8 . . . ) this would give us a transition between images as output1=I1, and output2=0.9*I1+0.1*I2, . . . ; until eventually output10=I2 as we have slowly transitioned from image 1 to image 2. In embodiments, the service provider computer may utilize control points on each shape of an image and slowly morph the images (e.g., from a source image to a target image) by moving the control points. In embodiments, an encoding and decoding network may be utilized to encode (extract features from images) and decodes (creates the images back from the features). In embodiments, the service provider computer may utilize an auto encoder that, given a first image, extracts a feature vector X1 which can be utilized by a decoder function F to reconstruct the same image in a multidimensional feature vector space. By utilizing the encoder and decoder the service provider computer may compare two feature vectors and morph one feature vector to another and as the system morphs between feature vectors an image is generated. In accordance with at least one embodiment a generative adversarial network (GAN) may be used to reconstruct images given a first image. As will be apparent to one of skill in the art, a generative adversarial network has an aspect that encodes objects (e.g., images) as feature vectors and an aspect that decodes objects from feature vectors (e.g., generates images from feature vectors). The encoder and decoder presented in FIG. 6 may encode objects such as images as feature vectors and may also decode objects from feature vectors thereby generating images from feature vectors. The workflow 600 of FIG. 6 include an image of an item 602 that is reconstructed by a computer system (service provider computer) at 604 after encoding 606 and decoding 608. In accordance with at least one embodiment, the service provider computer implementing the in-place scrolling feature may utilize a generative adversarial network that is trained using images from an item catalog. The neural network or computer vision algorithms may be trained using images from a particular item category of the item catalog such that interpretation of each image for an item category is more accurate within the same item category.

As illustrated in FIG. 6, the workflow 600 includes a computer system encoding 606 the image 602 as a set of code or values that describe or represent the image 602. The computer system encoding 606 the image 602 may utilize a generative adversarial network to generate the code or values that represent the image 602. The workflow 600 of FIG. 6 includes the code or values 610 that represent the image 602. The workflow 600 of FIG. 6 includes the computer system decoding 608 the code or values 610 for the image 602 to reconstruct the image 612. In accordance with at least one embodiment, the service provider computer implementing the in-place scrolling feature may utilize neural networks or computer vision algorithms that learn to encode and decode an image and reconstruct an image such as generative adversarial networks. As described in more detail in FIG. 7, the reconstructed images can be used to generate one or more interpolated images that may be injected or interspersed during the transition from a source image to a target image in response to receiving input such as a scroll input for a user interface. For example, the feature vector space created by the generative adversarial network includes points in the feature vector space corresponding to a source image and a destination image. A transition animation can be formed from images generated from feature vectors on a line or path in the feature vector space between the points corresponding to the source image and the destination image. The number of images in the transition may be selected to target a number of animation frames per second (e.g., 15, 30, 60 or more) and/or may be specified as a user preference. In the example that the source and destination images correspond to purchasable items in an electronic catalog, the interpolated transition images will not typically correspond to purchasable items in the electronic catalog.

Figure 7:
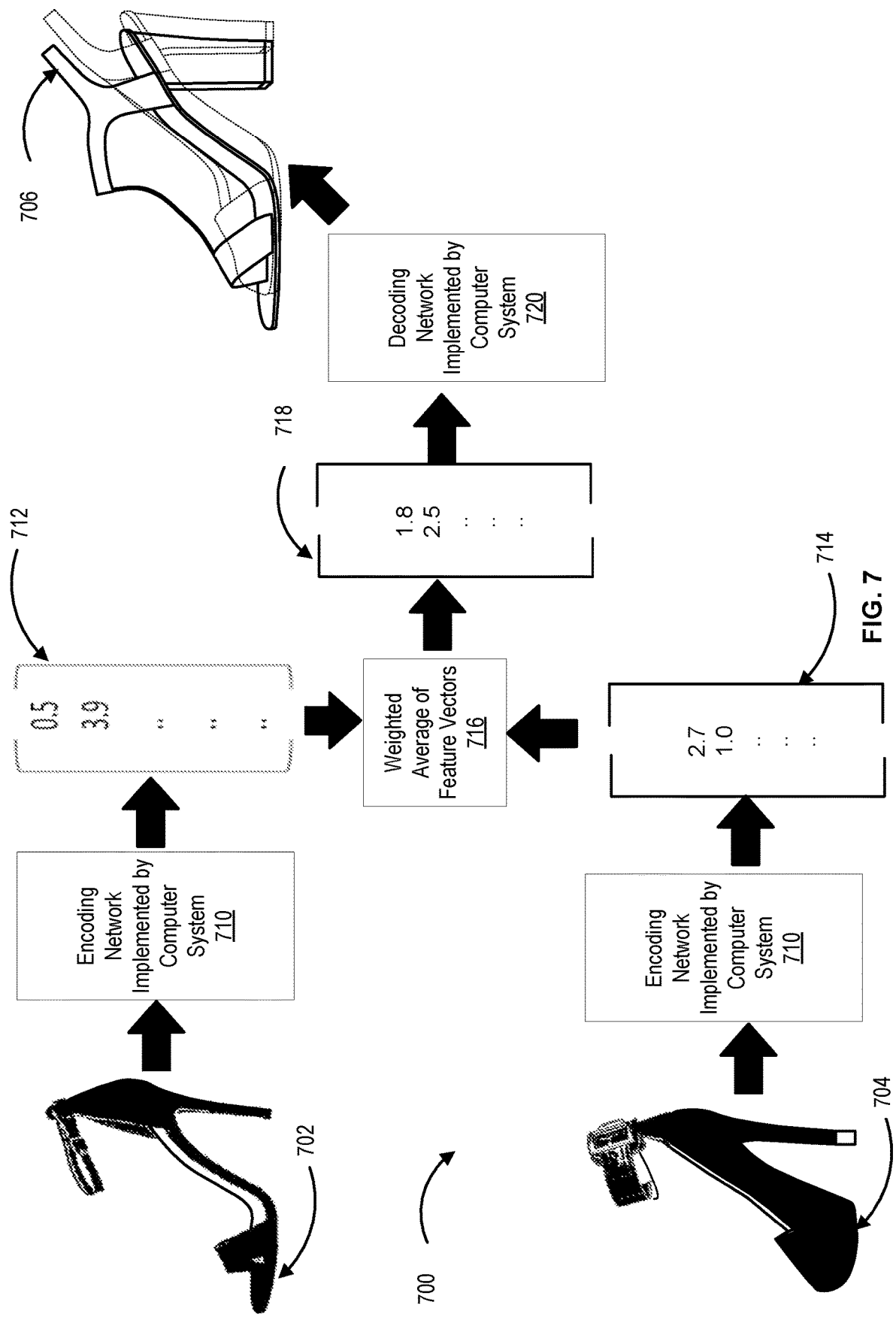
FIG. 7 illustrates an example workflow for generating an interpolated image from a source image of an item and a target image of an item by a computer system implementing the in-place scrolling feature, in accordance with embodiments.

FIG. 7 illustrates an example workflow for generating an interpolated image from a source image of an item and a target image of an item by a computer system implementing the in-place scrolling feature, in accordance with embodiments. FIG. 7 illustrates workflow 700 that includes a source image 702 of an item and a target image 704 of an item. The process depicted by workflow 700 may be implemented by a service provider computer utilizing an in-place scrolling feature described herein. In some embodiments, an in-place scrolling feature generates interpolated or computer generated images to include in a transition from a source image (702) (i.e., an image that a user has selected via a user interface) to a target image (destination image) (704) (i.e., a candidate images that is similar to the source image based on a Euclidean distance of feature vectors for the source image and candidate image). As described above in FIG. 6, the service provider computer implementing the in-place scrolling feature may utilize an encoding and decoding network or a generative adversarial network. The encoding and decoding network may be configured to encode objects (e.g., images 702 and 704) as feature vectors and decode objects from feature vectors (e.g., generates image 706) from the feature vectors of images 702 and 704.

The machine generated image 706 may be used to generate a smooth transition from a source image 702 to a target image 704 by interjecting and presenting the machine generated image 706 that share similar features such as shape, size, color, texture, etc., but that aren't actual images or images of items that exist. Instead, the machine generated image 706 is generated by the service provider computer for injection and presentation during a transition from one actual image to another image as a form of transitioning that does not rely on fading in and fading out but instead morphs the images as the user provides input. For example, in a user case where the user is viewing source image 702 and the service provider computer has determined, using the Euclidean distance of feature vectors between the images, that target image 704 is the most similar and therefor best candidate image to transition to in response to receiving a scroll input or gesture from a user interacting with a user interface. In embodiments, the user interface could be updated to do a straight transition from image 702 to 704 which may be jarring and disorienting. In embodiments, the service provider computer may utilize different weights b when determining the weighted average of feature vectors 716 which results in different feature vectors 718 and ultimately result in a different machine generated image (not pictured) generated by the decoding network 720.

The user interface could also be updated to transition between images 702 and 704 using a fade in and fade out process described earlier. In embodiments, the service provider computer may also transition between images 702 and 704 by morphing the images 702 and 704 slowly and by using the machine generated image 706. By morphing the images 702 to 704 using the machine generated image 706 a smoother transition may be achieved which can be easier to comprehend to a user's eyes and cause less disorientation upon providing a scroll input. In embodiments, the service provider computer may interject one or more computer generated similar images based on preferences of an administrator or based on user preferences. The workflow 700 of FIG. 7 includes encoding 710 the images 702 and 704 by the service provider computers (computer system) to generate feature vectors or values 712 and 714. In accordance with at least one embodiment, the service provider computer may generate a weighted average 716 of the feature vectors 712 and 714 for images 702 and 704 to generate a new set of vectors 718. In embodiments, the weight b, as described above, may decide whether the weighted average (new set of vectors 718) is closer to image 702 (e.g., b=1) or image 704 (e.g., b=0). The new set of vectors 718 may be used by the service provider computer to decode or implement generative adversarial network configured to be utilized as a decoding network 720 to generate machine generated image 706. Although the use of an encoding network and decoding network are described with reference to FIG. 7, it should be understood that the in-place scrolling feature can utilize multiple or different algorithms to generate interpolated images for use in transitioning from a source image to a target image.

Figure 8:
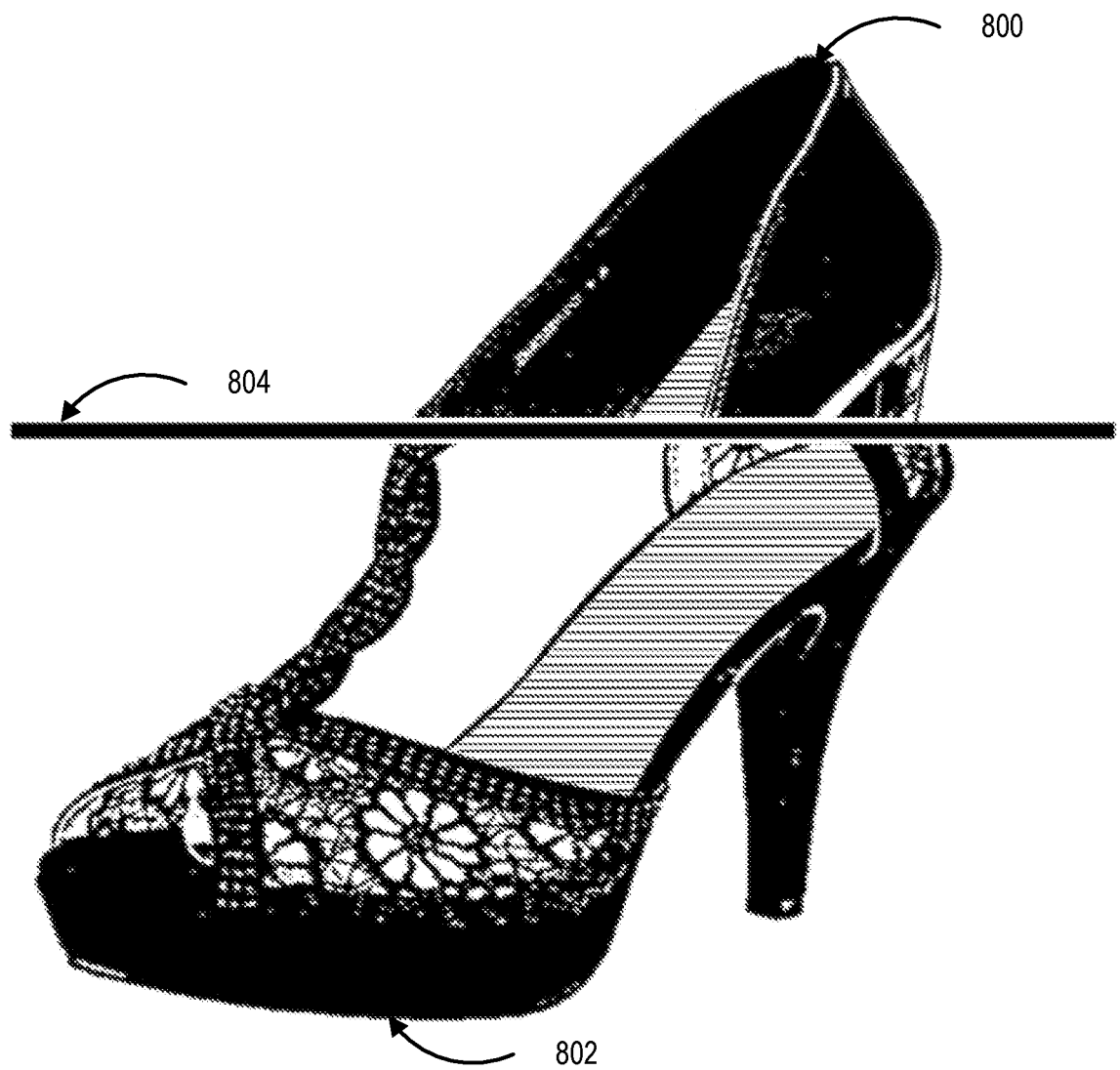
FIG. 8 illustrates an example comparison of two images of items in a user interface by a computer system implementing the in-place scrolling feature, in accordance with embodiments.

FIG. 8 illustrates a comparison of two images of items in a user interface by a computer system implementing the in-place scrolling feature, in accordance with embodiments. FIG. 8 illustrates a comparison feature of the in-place scrolling feature implemented by the service provider computers in embodiments. FIG. 8 includes a first image 800 of an item compared, via comparison feature 804, with a second image 802 of another item. In embodiments, the service provider computer can inject to include one or more interpolated or machine generated images or images of items during a transition from a first image (a source image) to a second image (a target image) in response to receiving input such as a gesture or a vertical scroll input from a user interacting with a user interface of a user device. The number of machine generated or interpolated images that are displayed during a transition between images can be specified by a user. During a transition from a first image to a second image a user may stop providing input (e.g., stop scrolling or providing input corresponding to a scroll gesture) during presentation of a machine generated image.

In accordance with at least one embodiment, the service provider computer may receive input or obtain input which indicates that the user is viewing or has stopped scrolling on a machine generated image. In response to the input the service provider computer may interpret or map this to a comparison feature to enable a user to compare two images. For example, FIG. 8 illustrates a comparison feature 804 which may be an interactable object, via the user interface, that the user can control to display more of the first image 800, or second image 802 such as by moving the comparison feature 804 up and down in the user interface. The images 800 and 802 need not be similar images that are being compared using the comparison feature 804 such as when a user merely wishes to compare two images in closer detail. In embodiments, the first image 800 and second image 802 may be similar according to a distance, such as a Euclidean distance, between the feature vectors determined by the service provider computer implementing the in-place scrolling feature described herein. The comparison feature illustrated in FIG. 8 provides an efficient use of screen space for a user interface and associated user device such that users can compare images or images of items that are similar to each other and without moving the user interface to different portions of a web page or application. As described above, upon receiving input that the user has stopped scrolling or is otherwise interacting with a machine generated image during a transition from a first image to a second image, the service provider computer may generate the comparison feature and update the user interface to present, simultaneously, a portion of the first image and a portion of the second image with the comparison feature interleaved or otherwise associated with first image and the second image. The portion of the first image or the portion of the second image may be adjusted by the user interacting with the comparison feature such that the user can compare the similar images to aid in comparison browsing or shopping.

Figure 9:
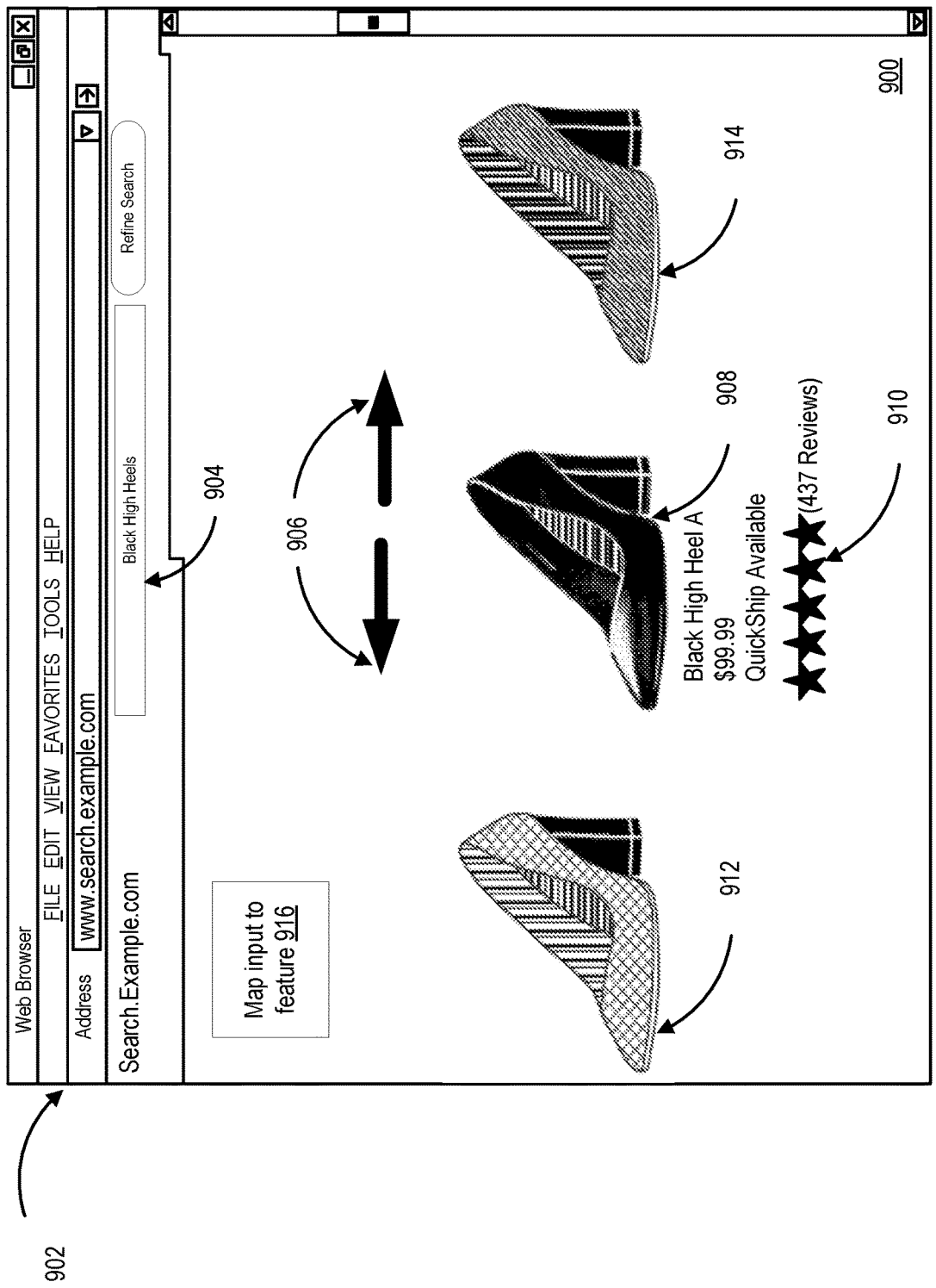
FIG. 9 illustrates an example user interface that implements the in-place scrolling feature, in accordance with embodiments.

FIG. 9 illustrates an example user interface that implements the in-place scrolling feature, in accordance with embodiments. FIG. 9 includes a user interface 900 presented via web browser 902 that implements or utilizes the in-place scrolling features described herein. The user interface 900 and web browser 902 may be configured to present images of items offered by an electronic marketplace similar to the user interface 200 and web browser 202 of FIG. 2. The web browser 902 of FIG. 9 may also include a search query field 904. As illustrated in FIG. 9 a user may provide a query for "Black High Heels" in the search query field 904. In accordance with at least one embodiment, the service provider computer implementing the in-place scrolling feature may be configured to receive or obtain input such as gestures provided by users interacting with a user interface and interpret the input and gestures for a number of features related to the image similar to the vertical scroll input described herein and identifying similar images to present in-place of the user interface without moving to a different portion of the user interface.

FIG. 9 illustrates user input that corresponds to a horizontal scroll 906. In embodiments, a user may have interacted with, or had image 908 in a focus location of user interface 900 prior to providing the horizontal scroll 906. The information 910 may also be presented for image 908 such as information about the item (high heel) included in image 908. In some embodiments, a horizontal scroll 906 may be interpreted as an interest in seeing a version of the item that varies in one or a relatively small number of human-apparent characteristics such as color, size, style, etc. For example, the image 908 may be of a black high heel shoe. The components of the vectors in the feature vector space need not correspond to such human-apparent characteristics, accordingly the service provider may train and/or maintain machine learning models corresponding to each human-apparent characteristic of interest. For example, in response to receiving the input (horizontal scroll 906) the service provider computer may utilize a machine learning model that serves as a color estimator. The color estimator may be configured to predict the actual color of an image or an item in the image based at least in part on the corresponding feature vectors, such as the feature vectors of the image 908 and other images (such as images 912 and 914) to identify similar images that are different colors of the same item. The horizontal scroll 906 may cause an update to the user interface 900 to present other images (912 and 914) in-place (e.g., at the focus location) where the other images 912 and 914 include different colors of the item included in image 908. For example, image 912 may include a blue color of the same high heel shoe included in image 908 while image 914 may include a red color of the same high heel shoe included in image 908. In accordance with at least one embodiment, other input or gestures may be mapped or interpreted by the service provider computer to provide additional features included in the in-place scrolling feature. In embodiments, other machine learning algorithms or feature-extraction networks may be trained to extract similar feature vectors for similar images which may correspond to texture, style, color, etc.

For example, a user may interact with a user interface, such as user interface 900, to zoom into an image such as image 908. Upon receiving the input that corresponds to the zoom of an image, the service provider computer may cause the user interface to update all peripheral or non-focus location images to transition to similar images as the image zoomed onto (such as image 908). In some embodiments, a user may zoom into, via the user interface, to a particular feature of an item included in an image. For example, the user may provide input which corresponds to a zoom in on a closure feature of the black high heel shoe included in image 908. In embodiments, the service provider computer may map the vector feature or use computer vision techniques to identify the feature or attribute associated with the area of the image 908 zoomed into by a user providing the input. In response to identifying the feature or attribute of the item the service provider computer may update the images presented via the user interface 900 such that the feature or attribute is updated but the rest of the image 908 remains the same if possible. For example, the black high heel shoe included in image 908 may update to different closure types such as closed shoe, zipper, laces, etc., while the heel shoe height, color, and shape remain the same given other images exist of the same high heel shoe with those features. This update to the user interface 900 enables a user to compare different features or attributes of an item without having to inefficiently scroll or browse through a large item catalog looking for a particular feature or attribute of an item they are interested in finding in an image of the item.

In embodiments, a user may engage the color changing feature, the comparison feature described in FIG. 8, or the feature or attribute update for items in an image by selecting a particular mode for the user interface 900 such as by interacting with radio buttons or other data objects (not pictured) that enable the comparison or other features described herein. It should be noted that although a vertical scroll may cause transitioning of images in-place as described with reference to FIG. 2 and other types of input, such as the horizontal scroll, may cause transitioning of a color of an image or of an item in an image, the inputs may be mapped or specified to other features described herein. For example, a horizontal scroll input may cause the user interface to update to present similar images in-place similar to the vertical scroll input interpretation described in FIG. 2. In embodiments, a user may interact with a UI element, such as UI element 916 to provide input which maps certain gestures to features described herein including the in-place scrolling feature, the comparison feature of FIG. 8, as well as the features described in FIG. 9 such as updating particular features of an item included in an image such as changing color or changing a shoe closure type for shoes displayed in images of user interface 900.

Figure 10:
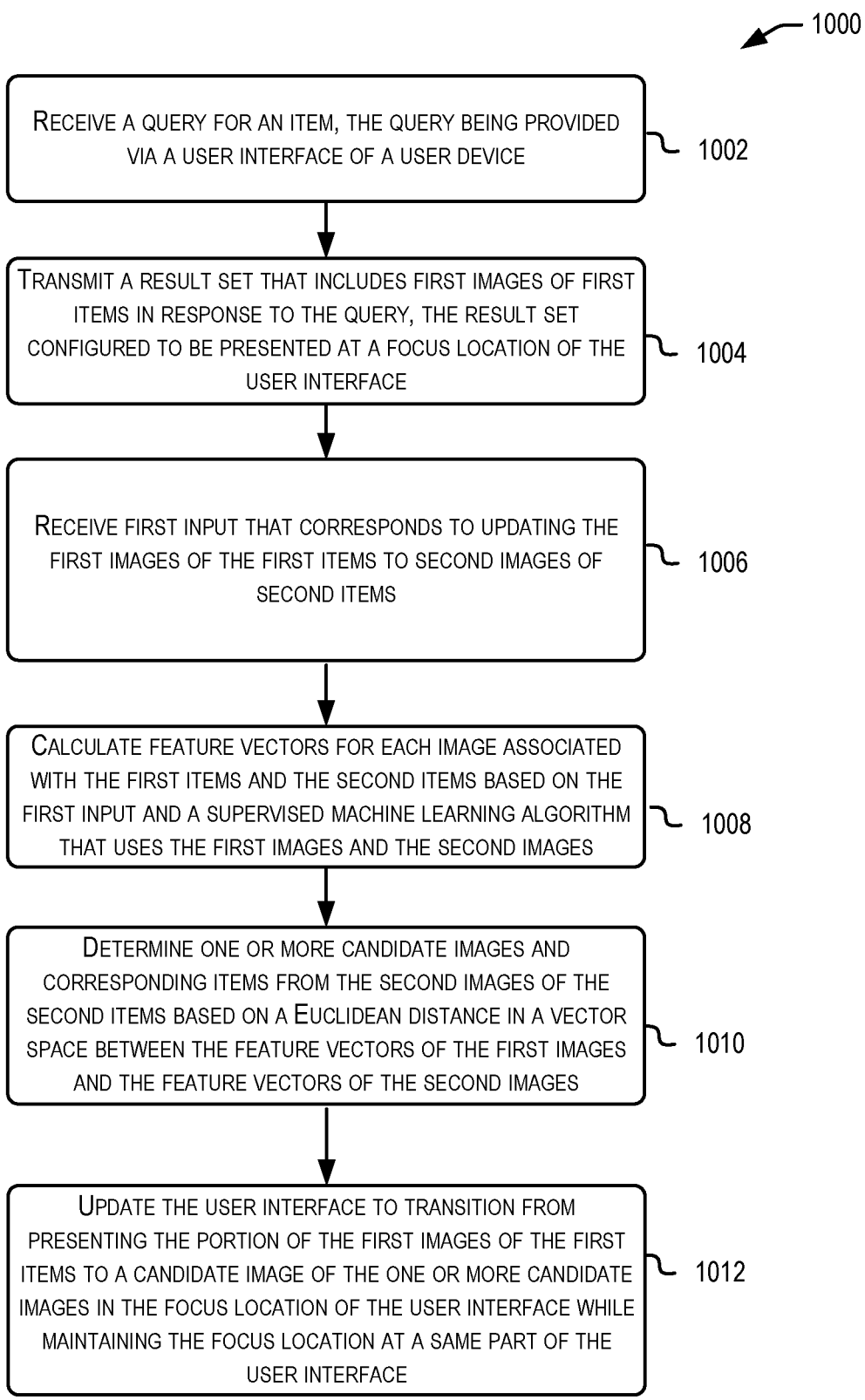
FIG. 10 illustrates an example flow diagram for an in-place scrolling feature, in accordance with embodiments.

FIGS. 10 and 11 illustrate example flow charts for an automated synchronization features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the descried operations can be combined in any order and/or in parallel to implement the process.

Additionally, some, any, or all of the processes (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 12:
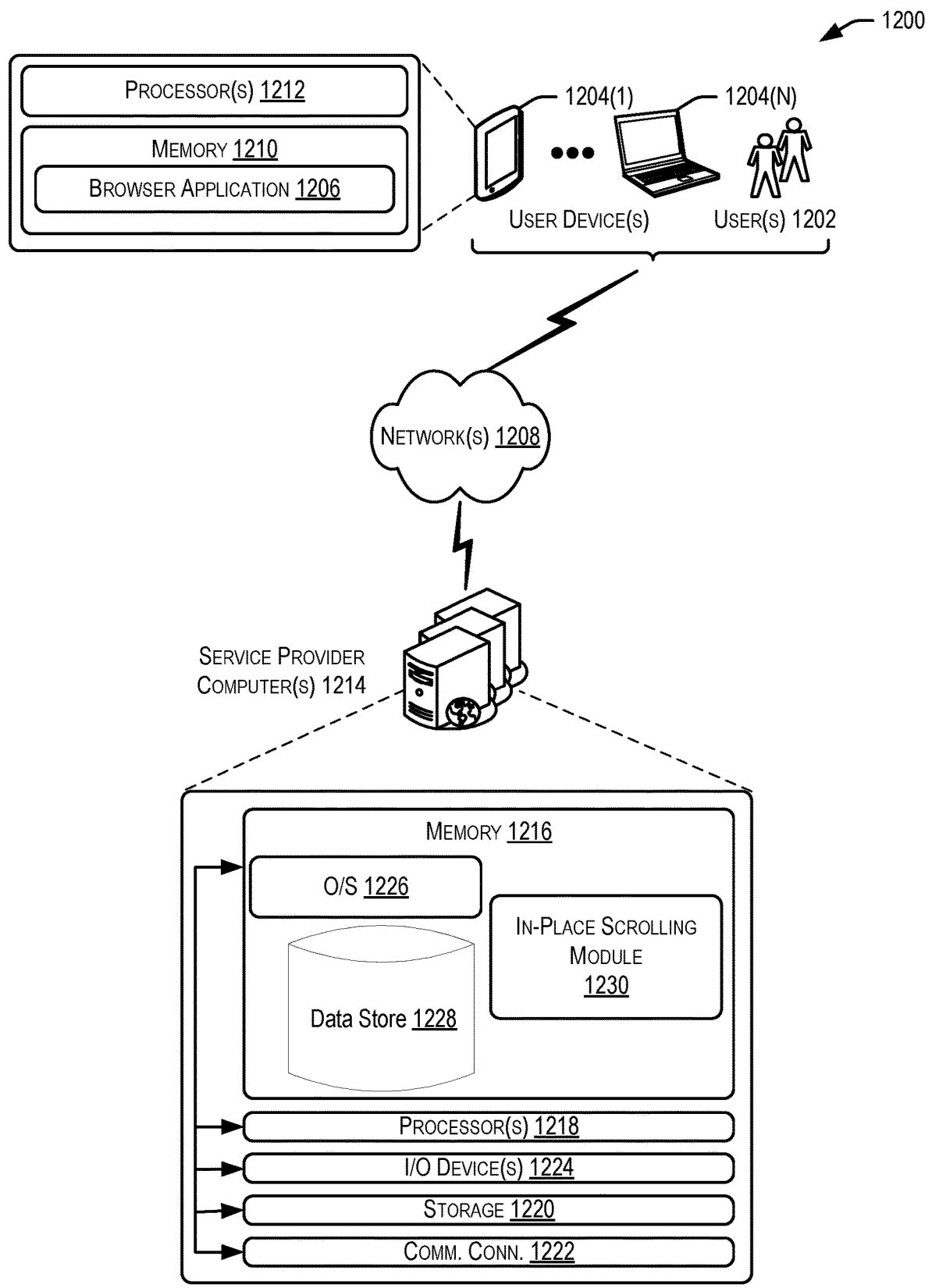
FIG. 12 illustrates an example architecture for implementing an in-place scrolling feature, in accordance with embodiments.

In some examples, the service provider computers (service provider computers 1214) utilizing at least the in-place scrolling module 1230 depicted in FIG. 12 may perform the processes 1000 and 1100 of FIGS. 10 and 11. In FIG. 10, the process 1000 may include receiving a query for an item where the query is provided via a user interface of a user device at 1002. For example, a user may utilize a web browser which displays a user interface associated with an electronic marketplace to provide a query for a specific item. The process 1000 may include transmitting a result set that includes first images of first items in response to the query where the result set may be configured to be presented at a focus location of the user interface at 1004. In embodiments, the user interface may be configured to present the result set in a configuration which includes a plurality of images where only a portion of the plurality of images of the result set can be presented at once in the user interface. In embodiments, the second images may include the other images included in the result set but are not currently displayed by the user interface due to screen real estate space constraints or other factors. In accordance with the in-place features implemented by the service provider computer the user interface may be updated to present some of the second images in response to receiving input via the user device such that the user is able to view more of the images of the result set without moving the focus of the user interface. In embodiments, the second images that are selected for presentation may include similar images based on a comparison of feature vectors of the first images and the second images. The process 1000 may include receiving first input that corresponds to updating the first images of the first items to second images of second items at 1006. In embodiments, the input may correspond to a vertical scroll that normally causes a change from a first location of the focus location in the user interface to a second location in the user interface. Although the input may correspond to a vertical scroll other inputs or gesture may be received by the service provider computer and interpreted to update the user interface to present new images in-place thereby maintaining the focus location of the user interface.

The process 1000 may include calculating feature vectors for each image associated with the first items and the second items based at least in part on the first input and a supervised machine learning algorithm that uses the first images and the second images at 1008. In accordance with at least one embodiment, the feature vectors for each image may include a plurality of values that represent each image as points in a vector space. The process 1000 may include determining one or more candidate images and corresponding items from the second images of the second items based on a Euclidean distance in a vector space between the feature vectors of the first images and the feature vectors of the second images at 1010. In embodiments, determining whether an image is similar to another image and therefore a potential candidate for updating the user interface with may not be limited to utilizing a Euclidean distance between feature vectors. Other distances such as a cosine distance in a feature vector space may be utilized to determine similarity between images. In embodiments, the candidate images may include images derived from the second images and included in the result set but were not currently viewed via the perspective of the user interface without scrolling to other locations of a web page or of the user interface itself. The process 1000 may include updating the user interface to transition from presenting the portion of the first images of the first items to a candidate image of the one or more candidate images in the focus location of the user interface while maintaining the focus location at a same part of the user interface at 1012. By updating the images from the first images to a candidate image of the one or more candidate images while maintaining the focus location a user is able to view more images included in the result set by providing input while not losing time by providing conventional scroll-stop input. Instead, the input updates the user interface to present images (candidate images) in-place such that the scrolling input updates the user interface without moving the focus location of the user interface avoiding situations where partial images are displayed in a periphery location of the user interface.

The process 1100 of FIG. 11 may include obtaining first input via a presented user interface to update one or more first images of first items to second images of second items at a focus location of the user interface at 1102. The process 1100 may include, in response to obtaining the first input, updating the user interface to transition from presenting the first images of the first items to a portion of the second images in the focus location while maintaining the focus location at a same part of the user interface. In embodiments, the first images of first items may be presented via the user interface in response to receiving a query for an item offered by an electronic marketplace. The user interface may be configured to present a result set that includes images of items, such as the first images of first items, along with information about the first items.

A user interacting with the user interface may desire to view other images included in the result set but not currently viewable or presented by the user interface due to the large number of images included in the result set and/or limited screen real estate of the user interface. The user may provide input such as a gesture or interacting with a touch screen of a user device to update the user interface. Conventionally this input would be interpreted to update the focus location of the user interface to move to a different location which would result in eventually displaying other images of the result set. However, during the transition of images in the result set presented via the user interface the user is less able to view the images and must stop providing input in order to view the updated user interface. The in-place feature implemented by the service provider computer can select a portion of second images included in the result set and update the user interface to transition the images presented via the user interface in-place (e.g., without moving the focus location). By transitioning the images in-place and maintaining the focus location a user is able to view the images while providing input to update the user interface.

FIG. 12 illustrates an example architecture for implementing an in-place scrolling feature, in accordance with embodiments. In architecture 1200, one or more users 1202 (e.g., users, consumers, etc.,) may utilize user computing devices 1204(1)-(N) (collectively, user devices 1204) to access a browser application 1206 or a user interface (UI) accessible through the browser application 1206, via one or more networks 1208 to receive images of items and information about the items offered by an electronic marketplace. The "browser application" 1206 can be any browser control or native application that can access and display a network page or other information such as a user interface of a native software application for enabling the presentation of images of items including an in-place scrolling feature that displays a smooth transition of images of items and similar images of similar items at a focus location of the user interface in response to receiving gestures from the browser application 1206 of the user device 1204 provided by users 1202. A native software application may include an application or program that has been developed for use on a particular platform (such as an operating system) or a particular device (such as a particular type of mobile device or user device 1204). In embodiments, the user device 1204 may include one or more components for enabling the user 1202 to interact with the browser application 1206.

The user devices 1204 may include at least one memory 1210 and one or more processing units or processor(s) 1212. The memory 1210 may store program instructions that are loadable and executable on the processor(s) 1212, as well as data generated during the execution of these programs. Depending on the configuration and type of the user devices 1204, the memory 1210 may be volatile (such as random access memory (RAM)) and/or non-volatile (such as read-only memory (ROM), flash memory, etc.). The user devices 1204 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 1204. In some implementations, the memory 1210 may include multiple different types of memory, such as static random access memory (SRAM), dynamic random access memory (DRAM), or ROM.

Turning to the contents of the memory 1210 in more detail, the memory 1210 may include an operating system and one or more application programs or services for implementing the features disclosed herein. Additionally, the memory 1210 may include one or more modules for implementing the features described herein including an in-place scrolling module 1230 (not pictured in user device 1204).

The architecture 1200 may also include one or more service provider computers 1214 that may, in some examples, provide computing resources such as, but not limited to, client entities, low latency data storage, durable data store, data access, management, virtualization, hosted computing environment or "cloud-based" solutions, gravitational route feature implementation, etc. The service provider computers 1214 may implement or be an example of the service provider computer(s) described herein with reference to FIGS. 1-11 and throughout the disclosure. The one or more service provider computers 1214 may also be operable to provide site hosting, computer application development, and/or implementation platforms, combinations of the foregoing, or the like to the one or more users 1202 via user devices 1204.

In some examples, the networks 1208 may include any one or a combination of many different types of networks, such as cable networks, the Internet, wireless networks, cellular networks, and other private and/or public networks. While the illustrated examples represents the users 1202 communicating with the service provider computers 1214 over the networks 1208 via user devices 1204, the described techniques may equally apply in instances where the users 1202 interact with the one or more service provider computers 1214 via the one or more user devices 1204 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 1214 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 1214 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 1214 may be in communication with the user device 1204 via the networks 1208, or via other network connections. The one or more service provider computers 1214 may include one or more servers, perhaps arranged in a cluster or as individual servers not associated with one another. In embodiments, the service provider computers 1214 may be in communication with one or more third party computers (not pictured) via networks 1208 to receive or otherwise obtain data including information about items and images for the items.

In one illustrative configuration, the one or more service provider computers 1214 may include at least one memory 1216 and one or more processing units or processor(s) 1218. The processor(s) 1218 may be implemented as appropriate in hardware, computer-executable instructions, firmware, or combination thereof. Computer-executable instruction or firmware implementations of the processor(s) 1218 may include computer-executable or machine-executable instructions written in any suitable programming language to perform the various functions described when executed by a hardware computing device, such as a processor. The memory 1216 may store program instructions that are loadable and executable on the processor(s) 1218, as well as data generated during the execution of these programs. Depending on the configuration and type of the one or more service provider computers 1214, the memory 1216 may be volatile (such as RAM) and/or non-volatile (such as ROM, flash memory, etc.). The one or more service provider computers 1214 or servers may also include additional storage 1220, which may include removable storage and/or non-removable storage. The additional storage 1220 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1216 may include multiple different types of memory, such as SRAM, DRAM, or ROM.

The memory 1216, the additional storage 1220, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1216 and the additional storage 1220 are all examples of non-transitory computer storage media. Additional types of non-transitory computer storage media that may be present in the one or more service provider computers 1214 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 1214. Combinations of any of the above should also be included within the scope of non-transitory computer-readable media.

The one or more service provider computers 1214 may also contain communication connection interface(s) 1222 that allow the one or more service provider computers 1214 to communicate with a data store, another computing device or server, user terminals, and/or other devices on the networks 1208. The one or more service provider computers 1214 may also include I/O device(s) 1224, such as a keyboard, a mouse, a pen, a voice input device, a touch input device, a display, speakers, a printer, etc.

Turning to the contents of the memory 1216 in more detail, the memory 1216 may include an operating system 1226, one or more data stores 1228, and/or one or more application programs or services for implementing the features disclosed herein including the in-place scrolling module 1230. In accordance with at least one embodiment, the in-place scrolling module 1230 may be configured to at least implement one or more algorithms or neural network algorithms such as computer vision algorithms and encoding and decoding network algorithms for identifying candidate images to utilize in an in-place scrolling feature. In embodiments, the in-place scrolling module 1230 may be configured to receive input provided by a user 1202 via user device 1204 and browser application 1206 that corresponds to a certain gesture such as a vertical scroll, a horizontal scroll, a zoom-in, a selection of an area of interest (such as by right clicking a mouse component of the user device 1204 on a certain part of an image), etc., for a user interface such as browser application 1206 presented via user device 1204. In response to receiving or otherwise obtaining the input from the user 1202 the in-place scrolling module 1230 may be configured to use a neural network algorithm to extract one or more feature vectors for each image of items presented via the browser application 1206. The feature vectors may be compared to determine a Euclidean distance between the feature vectors to find the images that are most similar to each other (e.g., have the least Euclidean distance between any two images using the feature vectors for the two images). The images with the least Euclidean distance to an image in the focus location of the user interface may be considered candidate images. The candidate images may be presented in an in-place scrolling feature such that as the user provides the input (e.g., scrolling input or gesture) the candidate images are presented in place at the focus location without moving the user interface to a different location. The in-place scrolling module 1230 may be configured to utilize one or more above referenced algorithms to perform other functions described herein including comparison features, updating particular feature of an image of an item in response to input as opposed to updating the entire image, etc.

Figure 13:
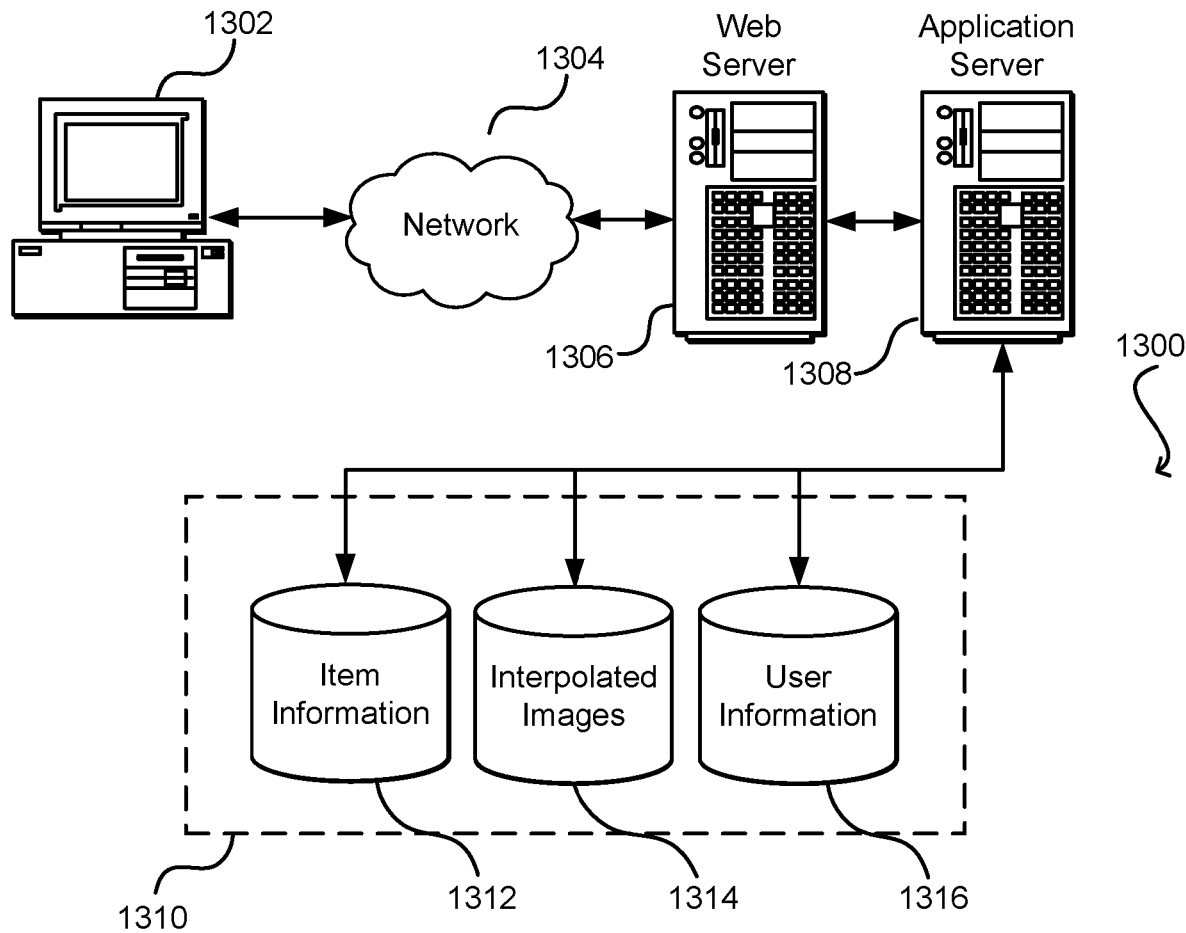
FIG. 13 illustrates an example environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing item information 1312 and user information 1316, which can be used to serve content for the production side such as by providing images of items and information about the item to be presented in-place at a focus location of a user interface in response to receiving input such as a scrolling gesture from a user interacting with the user interface. The data store also is shown to include a mechanism for storing interpolated images 1314, which can be used for inserting into a transition sequence from one image to another image to create a smooth transition when updating a user interface to provide the in-place scrolling feature described herein. A number of interpolated images 1314 may be selected and inserted during the transition. The number of the interpolated images 1314 may be specified by a user and stored in the user information 1316 as a user preference. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving first input via a presented user interface to update first images of first items to second images of second items, the first images of the first items presented in a focus location of the user interface;
    calculating feature vectors for each image associated with the first items and the second items based at least in part on the first input and a supervised machine learning algorithm that uses the first images and the second images to generate the feature vectors, the feature vectors including a plurality of values that represent each image of the first items and the second items as points in a vector space;
    determining one or more candidate images and corresponding items from the second images of the second items based at least in part on a distance in the vector space between the feature vectors of the first images and the feature vectors of the second images, browsing history of the user, and review ratings for the first items of the first images and the second items of the second images;
    updating the user interface to transition from presenting the first images of the first items and first information about the first items to a portion of the one or more candidate images in the focus location of the user interface while maintaining the focus location at a same part of the user interface; and
    generating a user interface object configured to be presented via the user interface and enable a comparison between images, the comparison including using the user interface object to simultaneously adjust a size of a first portion of an image of the first images and adjust the size of a second portion of a particular candidate image of the one or more candidate images in the focus location of the user interface.

2. The computer-implemented method of claim 1, wherein updating the user interface to transition from presenting the first images of the first items to a portion of the one or more candidate images in the focus location of the user interface includes fading out the first images and fading in the portion of the one or more candidate images.

3. The computer-implemented method of claim 1, further comprising extracting a silhouette of each item in each image of the first images and the second images using a computer vision algorithm.

4. The computer-implemented method of claim 3, wherein determining the one or more candidate images and the corresponding items is further based at least in part on comparing extracted silhouettes of each item in each image of the first images and the second images.

5. The computer-implemented method of claim 1, further comprising:
   receiving second input that corresponds to a particular portion of a particular image of the one or more candidate images for a particular item of the second items; and
   identifying a feature of the particular item that corresponds to the particular portion based at least in part on the feature vectors for the particular image.

6. The computer-implemented method of claim 5, further comprising updating only the feature of the particular item in the particular image in response to receiving third input via the presented user interface at the focus location presenting the particular image of the particular item.

7. The computer-implemented method of claim 5, wherein the second input corresponds to a user provided confirmation, via the user interface, of a feature update for the particular image of the particular item.

* * * * *